United States Patent
Hawkes et al.

(10) Patent No.: US 6,948,067 B2
(45) Date of Patent: Sep. 20, 2005

(54) EFFICIENT ENCRYPTION AND AUTHENTICATION FOR DATA PROCESSING SYSTEMS

(75) Inventors: Philip Michael Hawkes, Burwood (AU); Gregory G. Rose, Concord (AU)

(73) Assignee: Qualcomm, Inc., San Diego, CA (US)

( * ) Notice: Subject to any disclaimer, the term of this patent is extended or adjusted under 35 U.S.C. 154(b) by 223 days.

(21) Appl. No.: 10/205,114

(22) Filed: Jul. 24, 2002

(65) Prior Publication Data

US 2004/0019785 A1 Jan. 29, 2004

(51) Int. Cl.⁷ .................................................. H04L 9/00
(52) U.S. Cl. ...................... 713/168; 713/150; 713/151; 713/168; 713/171; 380/28; 380/30; 380/37; 380/42
(58) Field of Search .............................. 380/28, 30, 37, 380/42, 43, 277; 713/150, 151, 168, 171

(56) References Cited

U.S. PATENT DOCUMENTS

| | | | | |
|---|---|---|---|---|
| 4,918,728 A | * | 4/1990 | Matyas et al. | 380/280 |
| 2001/0046292 A1 | * | 11/2001 | Gligor et al. | 380/37 |
| 2002/0071552 A1 | * | 6/2002 | Rogaway | 380/37 |
| 2004/0017913 A1 | | 1/2004 | Hawkes et al. | |

OTHER PUBLICATIONS

P. Rogaway et al., OCB : A Block–Cipher Mode of Operation for Efficient Authenticated Encryption, Department of Computer Science, University of California at Davis, california,USA, Aug. 3, 2001.*

V. Gligor et al., On Message Integrity in Symetric Encryption, Nov. 10, 2000, VDG, Inc., Chevy Chase Maryland, Nov. 10, 2000.*

C. Jutla. Encryption Modes with almost free message integrity,. Advances in Cryptology–EUROCRYPT 2001. Lecture Notes in Computer Science, vol. 2045, B. Pfitzmann, ed., Springer–Verlag, 2001.*

* cited by examiner

Primary Examiner—Ayaz Sheikh
Assistant Examiner—Taghi T. Arani
(74) Attorney, Agent, or Firm—Phil Wadsworth; Sandip S. (Micky) Minhas; Jae-Hee Choi

(57) ABSTRACT

Methods and apparatus are presented for encrypting and authenticating data, wherein some data is encrypted and some data is not encrypted, but all of the data is authenticated. Different formulations for authentication blocks are used according to whether a block of data occupies a cleartext position or ciphertext position. The authentication blocks are then combined to form a checksum, which is encrypted to form an authentication tag.

15 Claims, 7 Drawing Sheets

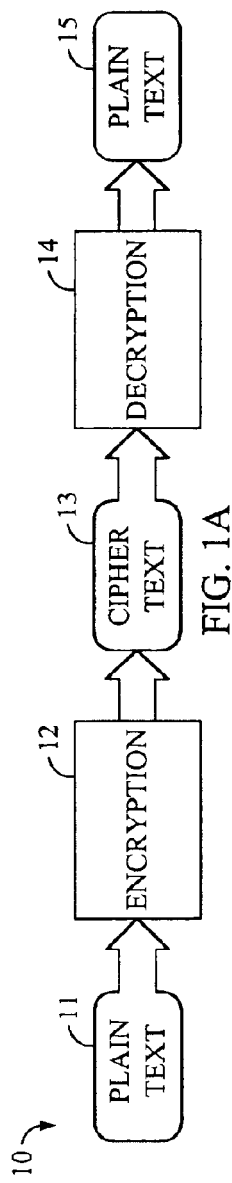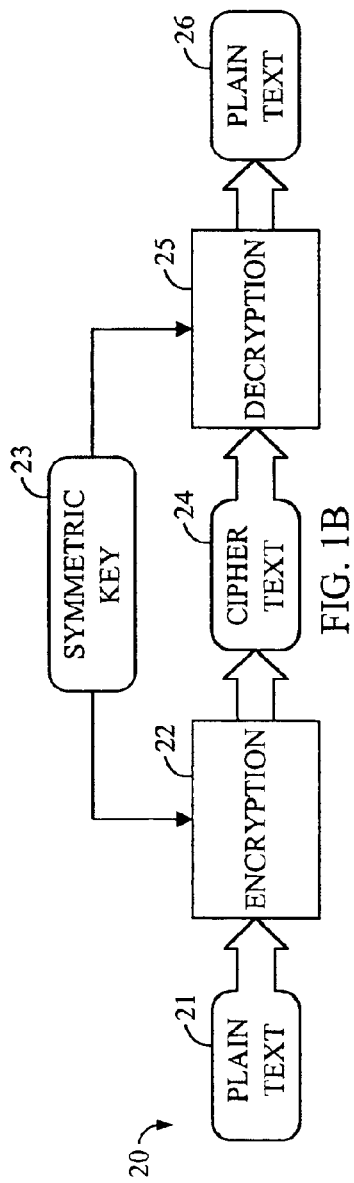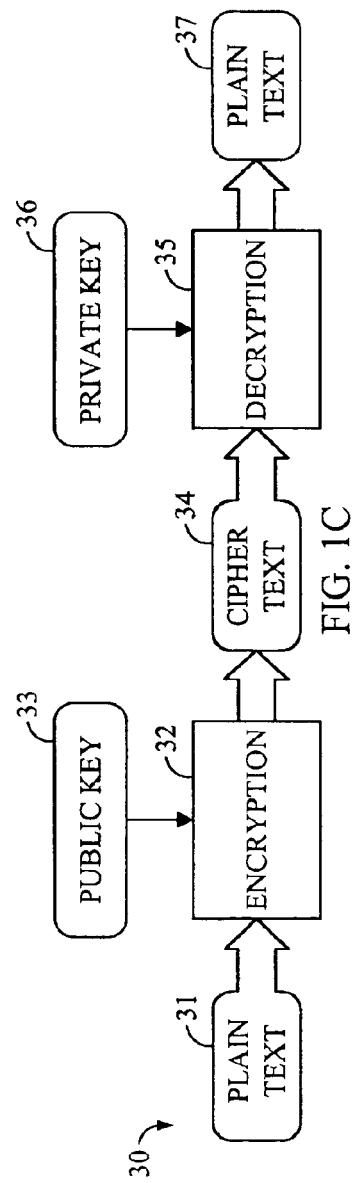

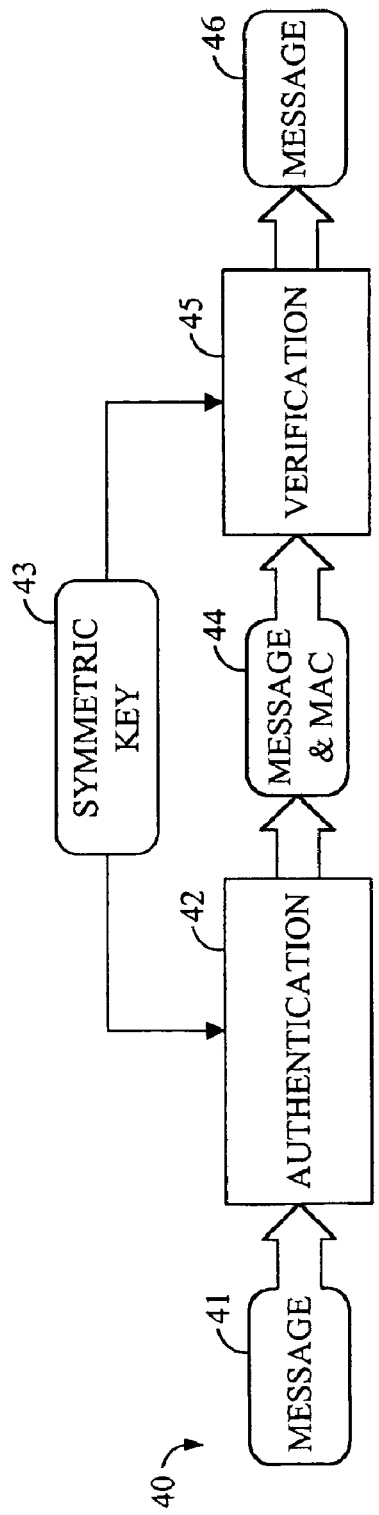
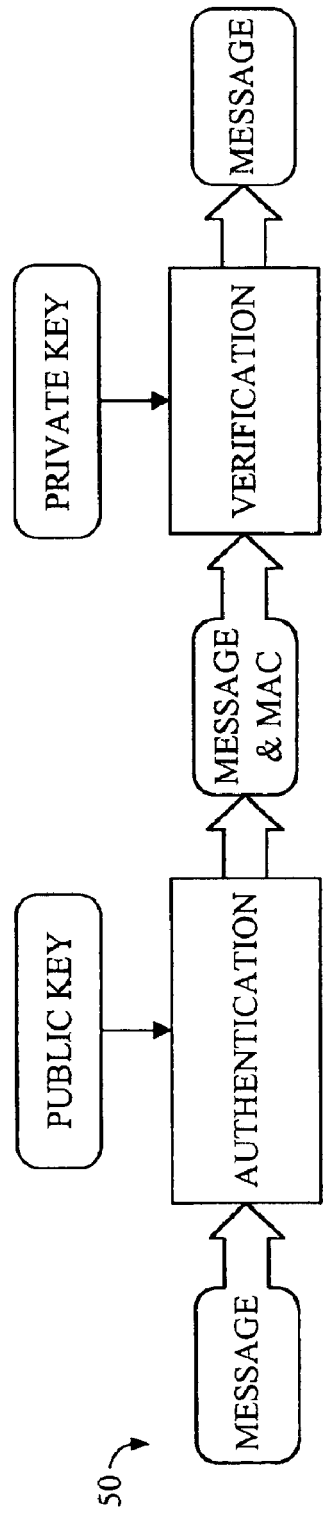
FIG. 2A
FIG. 2B

EFFICIENT ENCRYPTION AND AUTHENTICATION FOR DATA PROCESSING SYSTEMS

CROSS REFERENCE

This application is related to application Ser. No. 10/205,430 filed Jul. 24, 2002, entitled "Fast Encryption and Authentication for Data Processing Systems"; application Ser. No. 10/205,133 filed Jul. 24, 2002, entitled "Fast Encryption and Authentication for Data Processing Systems"; and application Ser. No. 10/205,132 filed Jul. 24, 2002, entitled "Efficient Encryption and Authentication for Data Processing Systems."

BACKGROUND

1. Field

The present invention relates to the field of data processing systems. In particular, to improving security in data processing systems.

2. Background

In a number of diverse fields, such as, e.g., electronic commerce, communications, and broadcasting, security is a major concern. Security measures contribute to accountability, fairness, accuracy, confidentiality, operability, and other criteria that are desired of data processing systems and information systems utilized in these fields. Cryptographic methods that provide such security are usually categorized according to two purposes: encryption and authentication. Encryption is the art of rendering data unreadable by unauthorized parties. Authentication is the art of verifying the integrity of the data. Verifying the integrity of the data involves verifying the author identity of the data and/or verifying whether the data has been altered.

Encryption systems are often referred to as cryptosystems, and have the property of being either symmetric or asymmetric. A symmetric encryption system uses a secret key to encrypt information and the same secret key to decrypt the encrypted information. An asymmetric encryption system, such as a public key cryptosystem, uses a first key to encrypt information and uses a different key to decrypt the encrypted information.

In many symmetric cryptosystems, one key is used for the encryption function and a separate key is used for the authentication function. Hence, in data processing systems using a symmetric cryptosystem, encryption and authentication are performed as two separate entities. Since authentication requires approximately as much processing power as encryption, the total amount of processing is equivalent to the amount of processing required to encrypt the data twice. In data processing systems that operate in a power-limited or hardware-limited environment, such as, e.g., a cellular telephone, personal digital assistant, or other portable communication device, it would be desirable to have a cryptosystem that can perform encryption and authentication as a single entity in order to reduce the computational load upon the device.

In the paper, "Encryption Modes with Almost Free Message Integrity," written by Charanjit Jutla, *Advances in Cryptology*, EUROCRYPT 2001, Lecture notes in Computer Science, vol. 2045, Springer-Verlag, 2001, cryptosystems were presented that can encrypt messages and authenticate the encrypted messages in a manner that requires little more processing than encryption alone. In other words, encryption and authentication can be performed using a single entity. Hence, the amount of processing resources required to provide security is reduced.

The Jutla cryptosystems are designed to encrypt all of the data that is to be transmitted. However, the requirement that all data of a message must be encrypted is undesirable in certain applications. For example, in communication protocols such as IPSec, encryption of all data is not efficient. A header portion of the data must be sent unencrypted for addressing purposes. The foundations of IPSec are specified in RFC 1825 entitled "Security Architecture for the Internet Protocol," RFC 1826 entitled "IP Authentication Header," and RFC 1827 entitled "IP Encapsulating Security Payload (ESP)," all of which were submitted by R. Atkinson in August 1995.

Hence, there is a present need for a secure and efficient system for encryption and authentication of data wherein all data bits of a message need not be encrypted.

SUMMARY

Methods and apparatus are presented herein to address the need stated above. Specifically, methods and apparatus are presented for allowing some portion of the data message to be transmitted as plaintext, some portion of the data message to be transmitted as ciphertext, and using a single authentication tag for verifying both the plaintext portion and the ciphertext portion of the data message.

In one aspect, a method is presented for encrypting and authenticating data as a single entity, the method comprising: arranging data into a plurality of plaintext blocks, each sized according to a cipher block size; specifying at least one cleartext position for which at least one ciphertext block will be the same as a corresponding plaintext block; determining a plurality of noise blocks using a nonce value and a first key; determining a plurality of intermediate ciphertext blocks, wherein the first intermediate ciphertext block corresponds to an encryption of the nonce, and the remaining intermediate ciphertexts are determined by: for each of the plurality of plaintext blocks specified by a cleartext position, combining the plaintext block with a corresponding noise block; and for each of the plurality of plaintext blocks not specified by a cleartext position, forming an intermediate plaintext block using the plaintext block and a preceding intermediate ciphertext block and then encrypting the intermediate plaintext block using a second key; determining a plurality of ciphertext blocks, wherein the plurality of ciphertext blocks are determined by: setting the first ciphertext block equal to the first intermediate ciphertext block; setting each of the ciphertext blocks specified by a cleartext position equal to a corresponding plaintext block; and determining each of the remaining ciphertext blocks by combining a corresponding intermediate ciphertext block with a corresponding noise block; determining a plurality of authentication blocks, wherein the plurality of authentication blocks are determined by: if an authentication block is associated with a plaintext block that is not specified by a cleartext position, then setting the authentication block equal to the plaintext block; if an authentication block is associated with a plaintext block that is specified by a cleartext position, then determining the authentication block by decrypting an associated intermediate ciphertext block and combining the decrypted associated intermediate ciphertext block with a preceding intermediate ciphertext block; computing an authentication tag by combining all of the plurality of authentication blocks with a noise block and then encrypting the combined result; and appending the authentication tag to the plurality of ciphertext blocks.

In another aspect, a method is presented for decrypting and verifying a plurality of transmission blocks accompanied by an authentication tag, comprising: determining a plurality of noise blocks using a nonce value and a first key; determining a plurality of intermediate ciphertext blocks by combining each of the plurality of transmission blocks with a corresponding noise block; determining a plurality of authentication blocks, wherein each of the plurality of authentication blocks is formed by decrypting a corresponding intermediate ciphertext block and then combining the decrypted intermediate ciphertext block with a preceding intermediate ciphertext block; setting each of the plurality of authentication blocks that is not associated with any predetermined cleartext position as a plaintext block; setting each of the plurality of transmission blocks that is associated with any predetermined cleartext position as a plaintext block; and verifying the authentication tag by determining whether the last authentication block equals the combination of all other authentication blocks.

In another aspect, a method is presented for secure data transmissions, wherein a first portion of the data transmission is sent as plaintext, a second portion of the data transmission is sent as ciphertext, and all of the data transmission is authenticated, the method comprising: generating a set of cleartext positions; encrypting the first portion of the data transmission and the second portion of the data transmission into ciphertext, wherein the first portion of the data transmission is specified by the set of cleartext positions and second portion of the data transmission is not associated with any one of the set of cleartext positions; determining a plurality of intermediate ciphertext blocks through an iterative procedure; generating a plurality of authentication blocks, wherein each of a first portion of the plurality of authentication blocks is set equal to a corresponding member of the first portion of the data transmission and each of a second portion of the plurality of authentication blocks is derived from combining a corresponding intermediate ciphertext block and a previous intermediate ciphertext block; generating an authentication tag by combining each of the plurality of authentication blocks and a noise block and encrypting the combined result; transmitting the plaintext, the ciphertext, and the authentication tag, wherein the plaintext is the first portion of the data transmission specified by the set of cleartext positions.

In another aspect, an apparatus is presented for secure data transmissions, wherein a first portion of the data transmission is sent as plaintext, a second portion of the data transmission is sent as ciphertext, and all of the data transmission is authenticated, the method comprising: means for generating a set of cleartext positions; means for encrypting the first portion of the data transmission and the second portion of the data transmission into ciphertext, wherein the first portion of the data transmission is specified by the set of cleartext positions and second portion of the data transmission is not associated with any one of the set of cleartext positions; means for determining a plurality of intermediate ciphertext blocks through an iterative procedure;

BRIEF DESCRIPTION OF THE DRAWINGS

FIGS. 1A, 1B, and 1C, are block diagrams of a basic cryptosystem, a symmetric encryption system, and an asymmetric encryption system.

FIGS. 2A and 2B are block diagrams of a symmetric authentication system and an asymmetric authentication.

DETAILED DESCRIPTION

Figure 3:
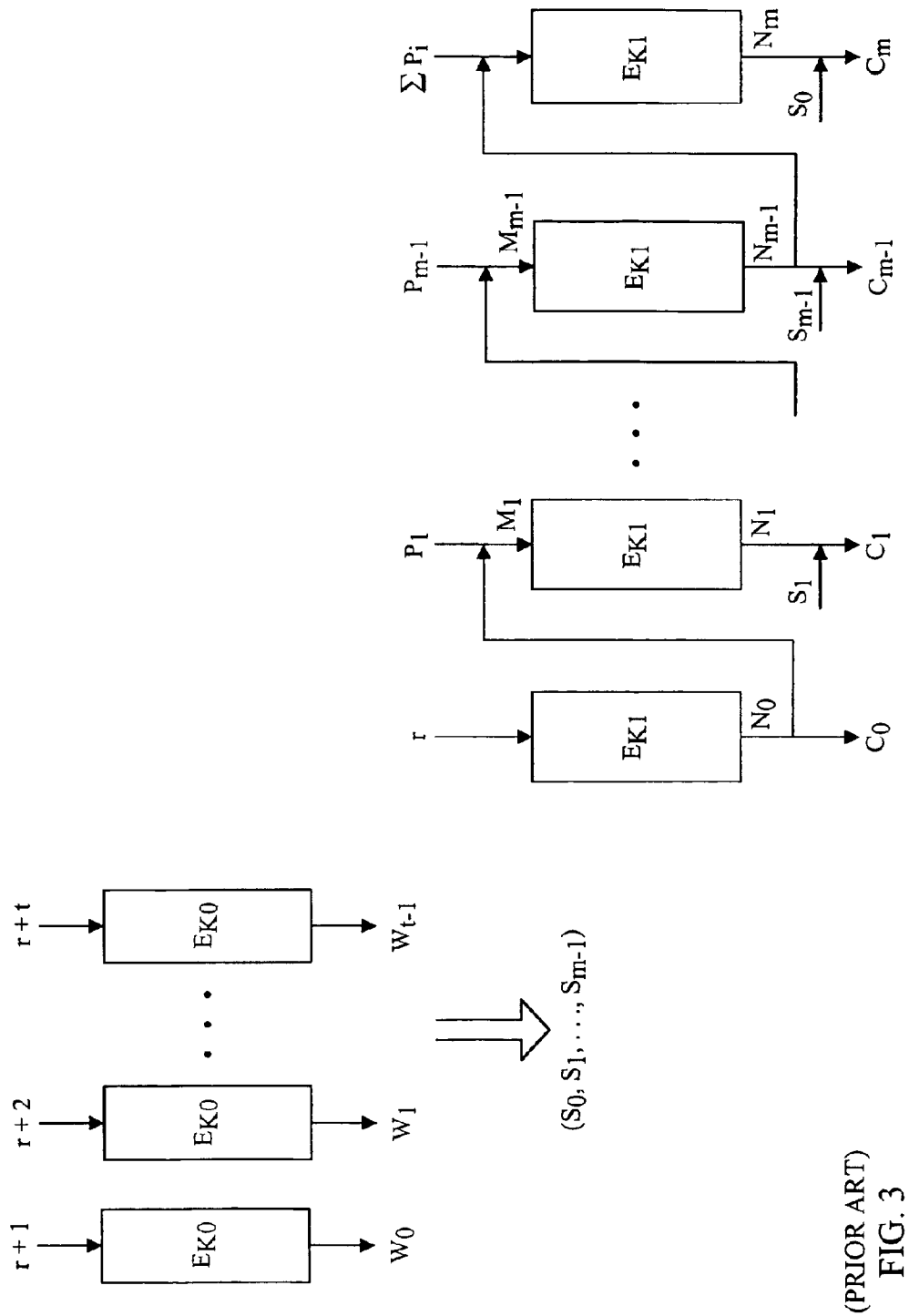
FIG. 3 is a block diagram of the Integrity Aware Cipher-Block Chaining Mode.

Encryption renders data unreadable by unauthorized parties. The original data message is referred to as a plaintext message or plaintext. The encrypted message is called a ciphertext, wherein encryption includes any means to convert plaintext into ciphertext e.g., block ciphers, hash functions, or any other cryptographic function. Decryption includes any means to convert ciphertext into plaintext, i.e., to recover the original message. FIG. 1A illustrates a basic cryptosystem 10 designed for encryption. The plaintext message 11 is operated upon by an encryption scheme 12 to form ciphertext 13. The ciphertext 13 is then transmitted through a communication channel (not shown) and undergoes a decryption scheme 14 at another site (not shown) to recover the plaintext 15. Plaintext and ciphertext can refer to any data, including audio and video data presented in digital form.

Cryptanalysis is the art of circumventing the security of cryptosystems. The entity performing the cryptanalysis is known in the art as an adversary or attacker. A cryptanalysis of an encryption scheme is directed towards decrypting an unauthorized message. A cryptanalysis of an authentication scheme is directed towards the composition of a message that can be verified as being sent by someone else.

A cryptosystem is based on secrets. A group of entities shares a secret if an entity outside this group cannot obtain the secret without expending a significantly large amount of resources. This secret is said to serve as a security association within the group of entities.

Typically, the secret comprises a key or a set of keys, which are measured in bits. The longer the key, the more cryptically secure the key will be. A symmetric cryptosystem uses the same secret key to encrypt a message as to decrypt a message. A symmetric encryption system 20 is illustrated in FIG. 1B, wherein both the encryption and decryption utilize a same private key. Plaintext 21 is operated upon by an encryption scheme 22. A secret key 23 is used in the encryption scheme 22 to form ciphertext 24. Cipher text 24 is transmitted over a communication channel (not shown) to another site wherein a decryption scheme 25 uses the same secret key 23 to form the plaintext 26.

In contrast, an asymmetric cryptosystem uses a first key to encrypt a message and uses a different key to decrypt it. FIG. 1C illustrates an asymmetric encryption system known as a public key cryptosystem 30, wherein a public key is provided for encryption and a private key is provided for decryption. The public key is published, so that any party can use the public key to encrypt any message. However, only the privately held, unpublished key may be used to decrypt the message encrypted with the public key. Plaintext 31 is input into an encryption scheme 32, which uses a public key 33 that is associated with a designated party and obtained from a publication. The resulting ciphertext 34 is transmitted over a communication channel (not shown) to the designated party. The designated party uses a private key 36 in a decryption scheme 35 to convert the ciphertext 34 into plaintext 37.

Symmetric encryption is generally much faster than asymmetric encryption. However, transfer of the secret key from a sender to a recipient is problematic due to the possibility of interception by an adversary. One solution is to use a trusted third party to hold the keys, who will share a key only with an authorized party. The embodiments described herein do not address this problem, and assumes that the sender and receiver share a secret key.

The integrity of the ciphertext generated by the above cryptosystems is typically provided by appending some authenticating data to the transmitted ciphertext. The authenticating data is usually computed as a function of the message content and a secret integrity key.

In a symmetric authentication system, the authenticating data is known as a Message Authentication Code (MAC). The MAC is computed as a function of both the message content and a secret integrity key, wherein both the sender and the designated target share the secret integrity key. The sender transmits the message and appends the MAC. The message can be either plaintext or ciphertext. The receiver re-computes the MAC from the message and accepts the integrity of the message only if the re-computed MAC agrees with the transmitted MAC. Theoretically, only the sender of the message could generate a valid signature for that message, thereby authenticating the message for the receiver.

A symmetric authentication system 40 is illustrated in FIG. 2A, wherein both the signing and verification utilize a same private key. The message 41 is operated upon by an authentication scheme 42 that uses a key 43 to form authenticating data 44. The authenticating data 44 and the message 41 are then transmitted through a communication channel (not shown) to another party (not shown). The message 41 is operated upon a verfification scheme 45 using a same key 43 to determine authenticating data 46. The authenticating data 46 that is generated by the receiving party is compared to the authenticating data 44 that is received over the communication channel.

In an asymmetric authentication system, the authenticating data is known as a digital signature. The digital signature is computed as a function of the message content and a private integrity key of the sender. The sender transmits the digital signature to a receiving party, who then performs a verification upon the digital signature using a public key of the sender. An asymmetric authentication system 50 is illustrated in FIG. 2B, wherein the signing utilizes a private key and the verification utilizes the corresponding public key.

In some schemes, the MAC or digital signature is computed from a 'message digest' that contains a unique mathematical description of a secret message. The message digest is smaller in length than the original message, so that computations upon the message digest are more easily performed. Dependence of the MAC or digital signature upon a secret message or upon a message digest ensures that the authenticating data does not remain constant, since the secret message or message digest does not remain constant. If the authenticating data does remain constant across multiple messages, then an adversary could easily appropriate the authenticating data falsely.

The message digest is often computed using a cryptographic hash function. A cryptographic hash function computes a value (comprising a fixed number of bits) from any input, regardless of the length of the input. One property of a cryptographic hash function is that given an output value, it is computationally difficult to determine an input that will result in that output. An example of a cryptographic hash function is SHA-1, as described in "Secure Hash Standard," FIPS PUB 180-1, promulgated by the Federal Information Processing Standards Publications (FIPS PUBS) and issued by the National Institute of Standards and Technology (NIST).

A block cipher is a symmetric encryption scheme for which the input to the scheme is always a fixed length in bits. The length is known as the block size of the block cipher. An example of a block cipher is the Data Encryption Standard (DES) as described in "Data Encryption Standard", FIPS PUB 46-1 promulgated by the FIPS PUBS and issued by the NIST. DES has a block size of 64-bits. Another example of a block cipher is the Advanced Encryption Standard (AES) as described in "Advanced Encryption Standard", FIPS PUB 197 promulgated by the FIPS PUBS and issued by the NIST. AES has a block size of 128-bits.

The key length of a block cipher is the length of the key in bits. However, the entropy of a key is the logarithm (base 2) of the number of possible values for the key. The entropy is also written in terms of bits. For example, the DES has a 64-bit key, with 8 of these bits used as checksums to detect errors in key transmission. Consequently, the key-entropy of DES is (64−8)=56 bits.

Given several pairs of inputs and corresponding outputs of a block cipher, the block cipher key can be derived by an adversary who tests all possible key values in order to determine which inputs result in the correct outputs. This type of attack is known as an exhaustive key search. The computational complexity of this attack is the number of encryption operations required for the attack. Hence, an attack for extracting a k-bit key requires approximately $2^k$ encryption operations to extract the block cipher key in an exhaustive key search.

Block ciphers are useful for constructing other cryptographic entities. The way in which a block cipher is used is called a mode of operation. Four modes of operation for DES have been standardized and are described in "DES Modes of Operation", FIPS PUB 81, promulgated by the FIPS PUBS and issued by the NIST. These four modes are Electronic Codebook (EBC), Cipher Bock Chaining (CBC), Output Feedback (OFB) and Cipher Feedback (CFB). For illustrative purposes, only ECB and CBC are discussed herein to encrypt a sequence of plaintext blocks $P_1, \ldots,$ and $P_m$.

In ECB mode, the block cipher is used to encrypt each block of plaintext into a block of ciphertext according to the following relation:

$$C_i = E_K(P_i),$$

where $E_K(P_i)$ denotes the encryption of the block $P_i$ using the key K. As used hereinafter, $D_K(P_i)$ denotes the decryption of block $P_i$ using the key K.

In CBC mode, the first plaintext block is XORed with a secret initial value (IV) to form a result that is then encrypted. A mathematical description of this process is written in accordance with the relation:

$$C_1 = E_K(P_1 \oplus IV).$$

Thereafter, each plaintext block is XORed with the previous ciphertext prior to encryption as follows:

$$C_i = E_K(P_i \oplus C_{i-1}).$$

Efficient encryption and authentication can be problematic in symmetric cryptosystems. Until recently, the only solution to satisfy this requirement was to use a naive approach: provide encryption and authentication as two separate functions. The two functions require approximately equal amounts of computation, so using both functions is twice as expensive as using only one or the other.

In the paper, "Encryption Modes with Almost Free Message Integrity," Jutla proposed two methods that provide encryption and authentication requiring only slightly more computations than either encryption or authentication alone. These methods are of a general form and employ a block cipher as a cryptographic kernel. In the cryptographic community, such a method is also called a "mode of operation." One of Jutla's mode of operations, known as Integrity Aware Parallelizable mode (IAPM) mode, is not discussed in this document. The other of Jutla's mode of operations, known as Integrity Aware Cipher-Block Chaining (IACBC) mode, is shown in FIG. 3. IACBC uses two keys: $K_0$ and $K_1$. Suppose a sender wishes to encrypt and authenticate a message consisting of (m−1) message blocks $P_1$ through to $P_{m-1}$. The sender sets t equal to the next integer greater than the logarithm (base two) of (m+1). The sender chooses a random value r that is encrypted to form ciphertext block $C_0$. The values of (r+1) through to (r+t) are encrypted to form values $W_0$ through to $W_{t-1}$, wherein the encryption uses the key $K_0$. The values $W_0$ through to $W_{t-1}$, are then used to derive pair-wise independent values $S_0$ through to $S_m$. The $S_i$ values are referred to herein as noise blocks. The values $S_0, \ldots, S_m$ are pair-wise independent if $S_0, \ldots, S_m$ are uniformly distributed n-bit random numbers with the property that for every pair $S_i$ and $S_j$, where i≠j, and every pair of n bit constants $c_1$ and $c_2$, the probability that $S_i = c_1$ and $S_j = c_2$ is $2^{-2n}$. The actual computation of $S_0$ through to $S_m$ is not relevant to the understanding of IACBC and will not be described herein. The values of the ciphertext blocks $C_1$ through to $C_{m-1}$, are derived iteratively for $1 \leq i \leq m-1$ according to the relations:

$$M_i = P_i \oplus N_{i-1},$$

$$N_i = E_{K1}(M_i),$$

$$C_i = N_i \oplus S_i,$$

wherein the key $K_1$ is used for each ciphertext block and the initial value $N_0$ is set to $C_0$. The values $M_i$ are called intermediate plaintext blocks and the values $N_i$ are called intermediate ciphertext blocks. The sender then computes a checksum value $P_m$, which is defined by:

$$P_m = P_1 \oplus P_2 \oplus \ldots \oplus P_{m-1}.$$

A MAC tag $C_m$ is computed from $P_m$ by encrypting $(P_m \oplus N_{i-1})$ with key $K_1$ and XORing the encrypted result with $S_0$. This action is represented mathematically by the relationship:

$$C_m = E_{K1}(P_m \oplus N_{i-1}) \oplus S_0.$$

The sender transmits $C_0 \ldots C_m$.

Suppose a receiver receives $C'_0 \ldots C'_m$. The receiver begins the decryption process by first decrypting $C'_0$ to form r', wherein the decryption uses the key $K_1$. The values of (r'+1) through to (r'+t) are encrypted to form values $W'_0$ through to $W'_{t-1}$, wherein the encryption uses the key $K_0$. The receiver then computes the values of $S'_0$ through to $S'_m$. The values of the ciphertext blocks $P_1$ through to $P_{m-1}$, are derived iteratively for $1 \leq i \leq m-1$ according to the following relations:

$$N'_i = C'_i \oplus S'_i,$$

$$M'_i = D_{K1}(N'_i),$$

$$P_i = N'_{i-1} \oplus M'_i,$$

wherein the key $K_1$ is used for each plaintext block and the initial value $N'_0$ is set equal to $C'_0$. The receiver then computes a checksum value $P_m'$ as defined by:

$$P_m' = P'_1 \oplus P'_2 \oplus \ldots \oplus P'_{m-1}.$$

A value X is computed by encrypting the XOR of $P_m$ with $N_{m-1}$ using key $K_1$, and then XORing the encrypted result with $S'_0$. Mathematically, the process can be described as follows:

$$X = E_{K1}(P'_m \oplus N'_{m-1}) \oplus S'_0.$$

If X and $C'_m$ are equal, then the receiver can be sure of the integrity of the encrypted message.

Gligor and Donescu, in the paper "Fast Encryption and Authentication: XCBC Encryption and XEBC Authentication Modes," proposed a similar mode called eXtended Ciphertext Block Chaining mode (XCBC mode) that provides encryption and authentication using a similar amount of computation. The main difference between XCBC and IACBC is in the formulation of the noise blocks $S_0$ through to $S_m$, the formulation of which is not relevant to this document.

The IACBC and XCBC modes of operation have certain undesirable properties. The first undesirable property is that these modes require all of the data to be sent encrypted. In Internet protocols such as IPSec, it is not desirable to transmit messages where all the data is encrypted. In particular, headers containing addressing information must be sent in the clear. The embodiments described herein propose a variant of the IACBC and XCBC modes that allows blocks of the data to be sent as plaintext, while adding only a small amount of processing. The variant is referred to herein as the CBC-A mode.

It should be noted that either hardware or software in data or communication systems could be configured to perform the different embodiments of the CBC-A mode. Hardware may include, but are not limited to, processing elements that implement a set of instructions stored on a computer-readable medium, e.g., memory, to perform the encryption, authentication, decryption, and verification processes that are described herein. Moveover, the various combination steps are described using the bit-wise, logical exclusive-or operator. Other implementations of the embodiments can be performed by using modular integer addition operations, wherein two inputs are treated as binary representations of integers, an intermediate value is formed as the binary representation as the sum of the integers, and the output is formed by truncating the intermediate value to the cipher block size. Other group operators can also be substituted for the various combination steps, however, for the purpose of illustrative ease, only the embodiments using XOR operators are described herein.

Figure 4A:
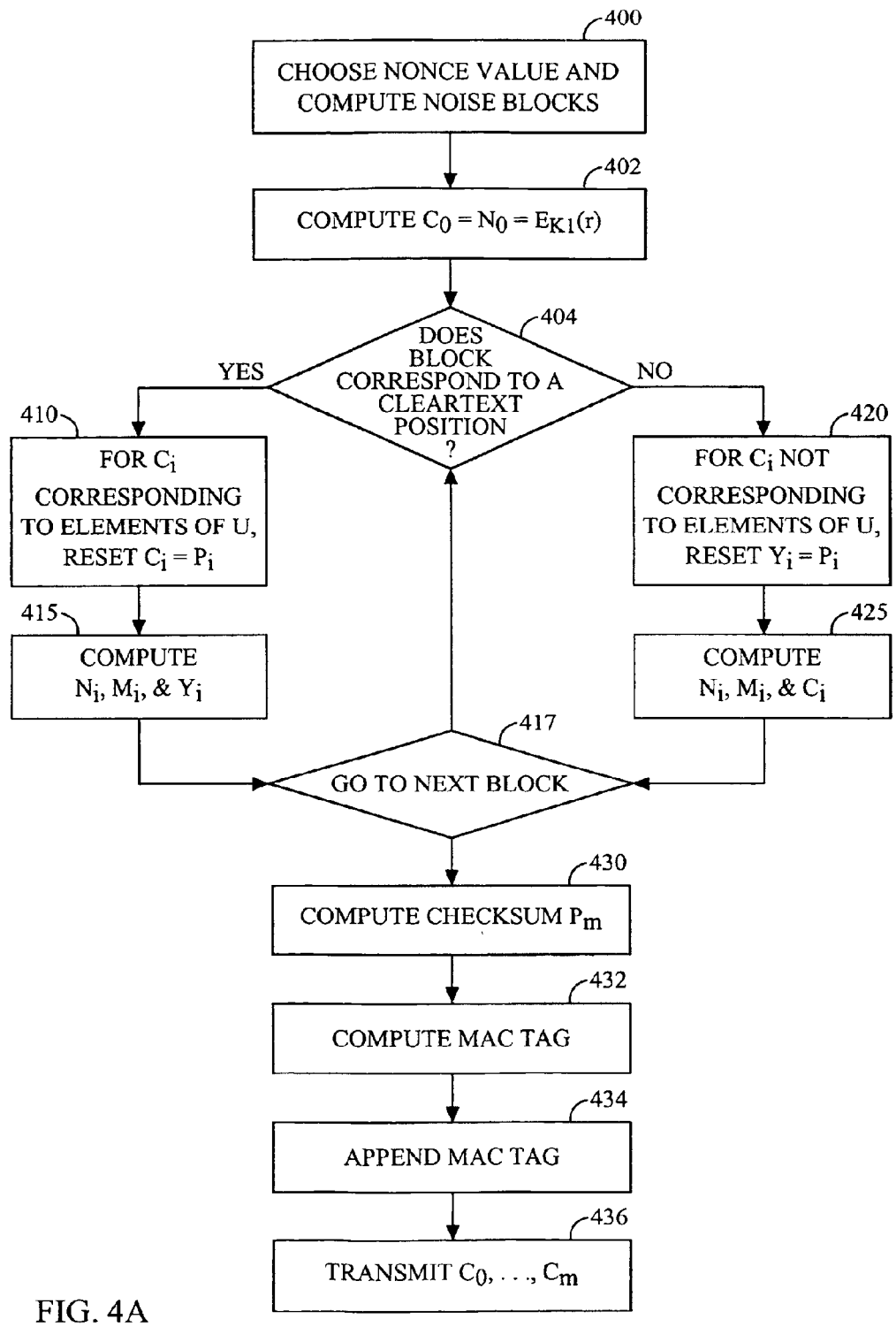
FIG. 4A is a block diagram of the CBC-A Mode.

An embodiment of the CBC-A mode is illustrated in FIG. 4A. The CBC-A mode of operation uses two keys: $K_0$ and $K_1$. Suppose a sender wishes to encrypt and authenticate a message consisting of (m−1) message blocks $P_1$ through to $P_{m-1}$. The sender and receiver agree on the set of plaintext blocks to be sent in unencrypted form. Let U denote the set of indices of the plaintext blocks to be sent in un-encrypted form, wherein the elements of U are referred to as cleartext positions. At step 400, the sender chooses r and follows the IACBC or XCBC mode to compute the noise blocks $S_0$ through to $S_m$. At step 402, the sender computes $C_0 = N_0 = E_{K1}(r)$. At step 404, an iterative procedure begins with a decision as to whether i∈U, where $1 \leq i \leq m-1$. If i∈U, the program flow proceeds to step 410. If i∉U, then the program flow proceeds to step 420.

If i∈U, then at step 410, set $C_i=P_i$. At step 415, compute:

$$N_i=P_i \oplus S_i,$$
$$M_i=E_{K1}(N_i), \text{ and}$$
$$Y_i=N_{i-1} \oplus M_i.$$

The program flow proceeds to step 417.
If i∉U, then at step 420, set $Y_i=P_i$. At step 425, compute:

$$M_i=P_i \oplus N_{i-1},$$
$$N_i=E_{K1}(M_i), \text{ and}$$
$$C_i=N_i \oplus S_i.$$

The program flow proceeds to step 417. At step 417, the index i is incremented, i.e., the next block will be manipulated. If another block is to be processed, then the program flow returns to step 404. If no more blocks are to be processed, then the program flow proceeds to step 430. The above process is for obtaining the ciphertexts $C_0$ through to $C_{m-1}$, and authentication blocks $Y_1$ through to $Y_{m-1}$. The values $N_0$ through to $N_{m-1}$ are called intermediate ciphertext blocks. At step 430, the sender computes checksum value $P_m$ as:

$$P_m=Y_1 \oplus Y_2 \oplus \ldots \oplus Y_{m-1}.$$

At step 432, a MAC tag $C_m$ is computed by encrypting $M_m$, wherein $M_m$ is formed by XORing $P_m$ with $N_{m-1}$. $M_m$ is encrypted with key $K_1$. This process is described mathematically as follows:

$$C_m=E_{K1}(P_m \oplus N_{m-1}).$$

At step 434, the sender appends the MAC tag $C_m$ to the message. At step 436, the sender transmits $C_0 \ldots C_m$.

Figure 4B:
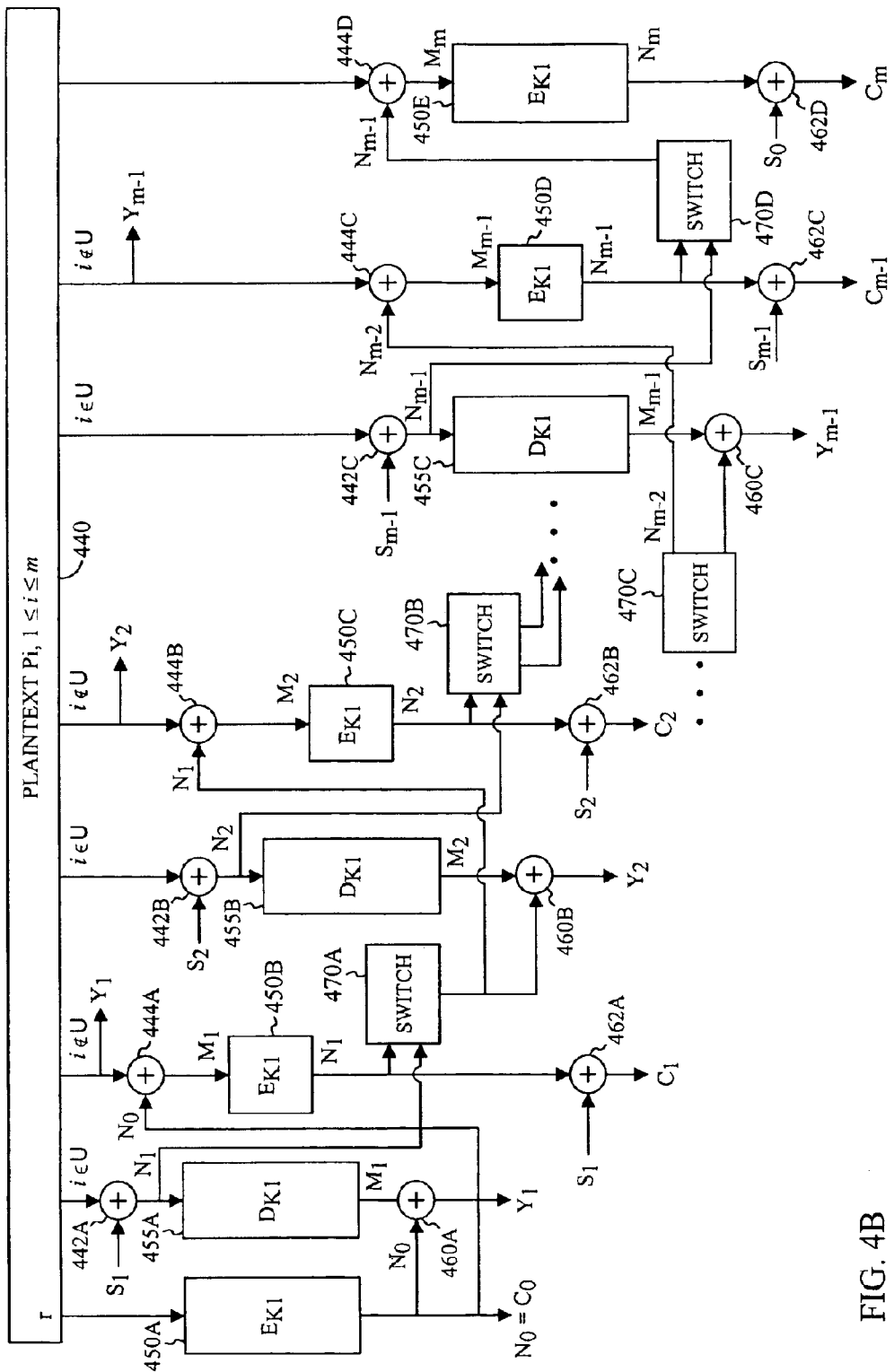
FIG. 4B is a block diagram of hardware configured to perform the CBC-A Mode.

FIG. 4B is a block diagram of hardware that is configured to perform the above CBC-A mode. It should be noted that FIG. 4B illustrates an implementation that can be an alternative to a software implementation, wherein a processor and memory is configured to execute a set of instructions for performing the above CBC-A mode. Memory element 440 stores plaintext blocks $P_i$, some of which are to be encrypted and all of which are to be authenticated. Encryption elements 450A, 450B, 450C, 450D, and 450E are configured to perform a cryptographic function using a key $K_1$, which has been agreed upon between the sender and the recipient during a key negotiation process, the details of which will not be discussed herein. For illustrative purposes only, five (5) encryption elements are shown in FIG. 4B for encrypting plaintext blocks, but one of skill in the art knows that more or less encryption elements can be implemented without affecting the scope of the embodiments. The input to the first encryption element 450A is the nonce value r, which will be used to determine noise blocks $S_0, S_1, \ldots, S_{m-1}$. The hardware configuration for generating the noise blocks is not shown herein. The output of the first encryption element 450A is the first ciphertext block $C_0$, which is set equal to the first intermediate ciphertext block $N_0$.

The inputs to the other encryption elements 450B, 450C, 450D, and 450E are intermediate plaintext blocks $M_1, \ldots, M_m$, individually, at each respective encryption element. The intermediate plaintext blocks $M_1, \ldots, M_m$ are the output of combining elements 444A, 444B, 444C, and 444D. The inputs to each of the combining elements 444A, 444B, 444C, and 444D are a plaintext block $P_i$, for i∉U, and an intermediate ciphertext block $N_{i-1}$. In one aspect, the combining elements described herein are XOR gates. In another, the combining elements are group operators.

The outputs to the encryption elements 450B, 450C, 450D, and 450E are intermediate ciphertext blocks $N_i$, for i∉U. The intermediate ciphertext blocks $N_i$, for i∉U, are each combined with a corresponding noise block $S_i$ at combining element 462A, 462B, 462C, or 462D to form ciphertext blocks $C_i$, for i∉U. The intermediate ciphertext blocks $N_i$, for i∉U, are also input into one of the switching elements 470A, 470B, 470C, or 470D, which will be discussed later.

Decryption elements 455A, 455B, and 455C are configured to perform a cryptographic function that is the reverse of the one used for encryption elements 450A, 450B, 450C, 450D, and 450E. The inputs to decryption elements 455A, 455B, and 455C are intermediate ciphertext blocks $N_i$, for i∈U. The intermediate ciphertext blocks $N_i$, for i∈U, are the output of combining elements 442A, 442B, and 442C. The inputs to each combining element 442A, 442B, or 442C are a plaintext block $P_i$ and a noise block $S_i$. The output of the decryption elements 455A, 455B, and 455C are the intermediate plaintext blocks $M_i$, for i∈U. The intermediate plaintext blocks $M_i$, for i∈U, are combined with a previous intermediate ciphertext block $N_{i-1}$ at each of the combining elements 460A, 460B, and 460C, respectively, to form authentication blocks $Y_{m-1}$.

At each stage, an intermediate ciphertext blocks $N_i$, for i∈U, and an intermediate ciphertext block $N_i$, for i∉U are input into a switching element 470A, 470B, 470C, or 470D. A control line (not shown) from a processing element controls the decision to use either intermediate ciphertext block for computations at the next stage.

At the last stage, the authentication tag $C_m$ is formed by combining the last intermediate ciphertext block $N_m$ with the first noise block $S_0$.

Figure 5:
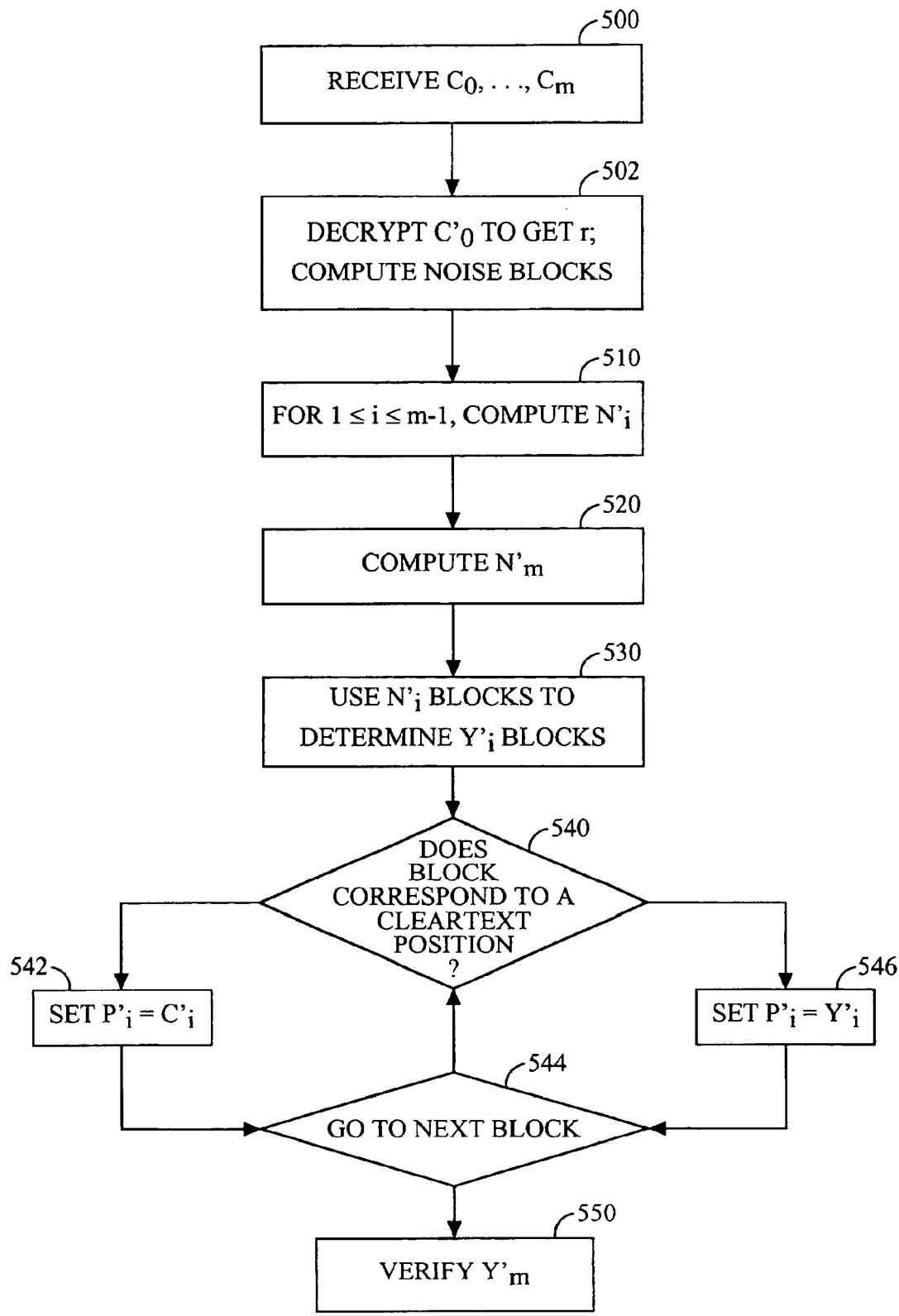
FIG. 5 is a block diagram of the decryption and verification of a message that has been encrypted and authenticated by CBC-A mode.

FIG. 5 is a block diagram of the decryption and verification of a message that has been encrypted and authenticated by CBC-A. Suppose a receiver receives transmission blocks $C'_0 \ldots C'_m$ at step 500. Note that for i∈U, $C'_i$ was transmitted unencrypted. At step 502, the receiver decrypts $C_0$ to obtain r' and thereby derives the values of $S'_0$ through to $S'_m$. In alternate embodiments, the nonce value r can be a value that is pre-negotiated or predetermined.

At step 510, for $1 \le i \le m-1$, the receiver XORs $C'_i$ with $S'_i$ to form intermediate ciphertext blocks $N'_i$ according to the relation:

$$N'_i=C'_i \oplus S'_i.$$

At step 520, the receiver forms $N'_m=C'_m \oplus S'_0$, wherein receiver sets $N'_0=C'_0$. At step 530, the receiver decrypts the sequence of intermediate ciphertexts $N'_0, \ldots, N'_m$ to form authentication blocks $Y'_1, \ldots, Y'_m$ using decryption in CBC mode. This proceeds iteratively, and is expressed in mathematical terms as:

$$Y'_i=D_{K1}(N'_i) \oplus N'_{i-1}, \text{ for } 1 \le i \le m.$$

At step 540, an iterative procedure begins in order to determine values for $P'_i$. For i∈U, the program flow proceeds to step 542, wherein the receiver sets $P'_i=C'_i$. The program flow proceeds to step 544. For i∉U, the program flow proceeds to step 546, wherein the plaintext blocks are set the same as the authentication block, that is, the receiver sets $P'_i=Y'_i$. The program flow proceeds to step 544. At step 544, the receiver determines whether another block is to be processed. If so, the program flow returns to step 540. If not, the program flow proceeds to step 550. The receiver has now decrypted the ciphertext to the data blocks $P'_1, \ldots, P'_{m-1}$, but the receiver needs to verify the integrity.

To verify the authentication tag, at step 550, the receiver confirms that $Y'_m$ is equal to the value of $(Y'_1 \oplus Y'_2 \oplus \ldots \oplus Y'_{m-1})$. If the authentication tag is verified, then the message is $P'_1, \ldots, P'_{m-1}$.

In an alternate embodiment that reduces processing time, the verification of the authentication tag at step 550 can be performed immediately after step 530, either before step 540 or in parallel to step 540. Hence, the receiver can authenticate the received message before determining the text of the message. If the received message is not authenticated, then the receiver can conserve processing resources by omitting the steps for determining plaintext blocks $P'_i$. In contrast, the IACBC mode proposed by Jutla requires the determination of plaintext blocks $P'_i$ and the encryption of a resultant form thereof in order to compute a test authentication tag.

Figure 6D:
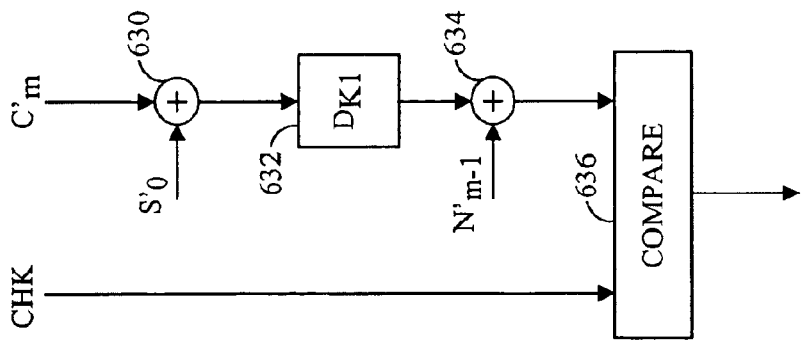
FIGS. 6A, 6B, 6C and 6D are different hardware configurations for performing the verification of the authentication tag.
Figure 6C:
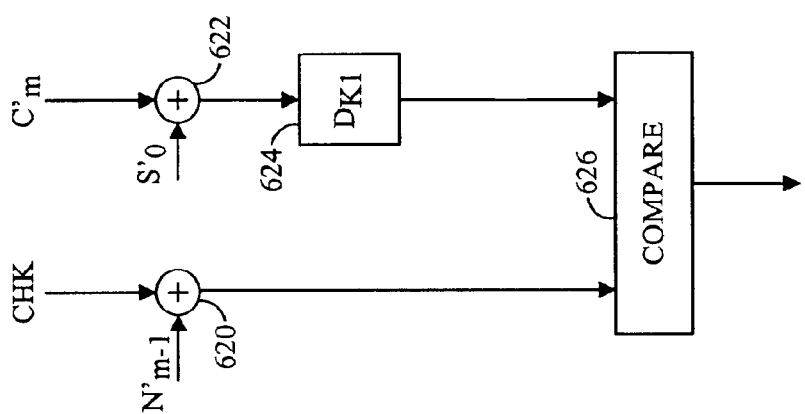

In additional, alternate embodiments, the verification of the authentication tag can be performed by comparing the value $(Y'_1 \oplus Y'_2 \oplus \ldots \oplus Y'_{m-1})$ to another quantity, other than $Y'_m$. FIG. 6A shows one alternative hardware implementation. The checksum value CHK is set equal to $(Y'_1 \oplus Y'_2 \oplus \ldots \oplus Y'_{m-1})$. The CHK value is combined with the intermediate ciphertext block $N'_{m-1}$ by combining element 600. The output of combining element 600 is then encrypted by encryption element 602. The output of encryption element 602 is then combined with the first noise block $S'_0$ at combining element 604. The output of the combining element 604 is then compared at comparing element 606 to the last ciphertext block $C'_m$, wherein a match indicates that the authentication tag is verified.

Figure 6B:
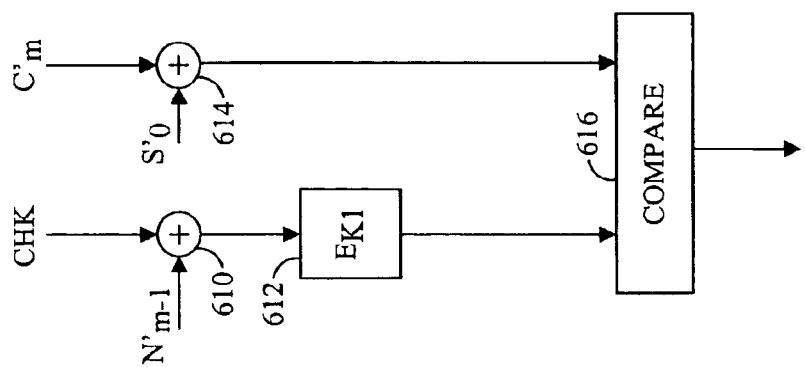
Figure 6A:
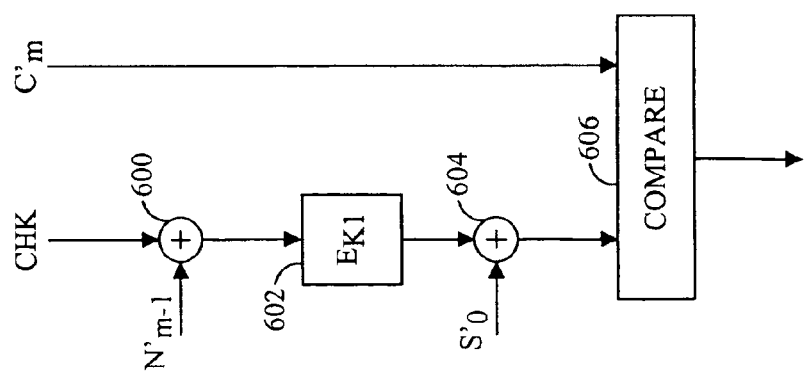

FIG. 6B is another alternative hardware embodiment for verifying the authenticity of the received message. The CHK value is combined with an intermediate ciphertext block $N_{m-1}$ by combining element 610. The output of combining element 610 is then encrypted by encryption element 612. The last ciphertext block $C'_m$ is combined with the first noise block $S'_0$ by combining element 614. If the output of the encryption element 612 matches the output of the combining element 614 at comparing element 616, then the received message is verified.

FIG. 6C is another alternative hardware embodiment for verifying the authenticity of the received message. The CHK value is combined with an intermediate ciphertext block $N'_{m-1}$ by combining element 620. The last ciphertext block $C'_m$ is combined with the first noise block $S'_0$ by combining element 622. The output of combining element 622 is then encrypted by decryption element 624. If the output of decryption element 624 matches the output of the combination element 620 at comparing element 626, then the received message is verified.

FIG. 6D is another alternative hardware embodiment for verifying the authenticity of the received message. The last ciphertext block $C'_m$ is combined with the first noise block $S'_0$ by combining element 630. The output of combining element 630 is then decrypted by decryption element 632. The output of decryption element 632 is then combined with intermediate ciphertext block $N'_{m-1}$ by combining element 634. If the output of combining element 634 matches the CHK value at comparing element 636, then the received message is verified.

Note that, for a given ciphertext $C'_0, \ldots, C'_{m-1}$, the authentication tag $C_m$ is the same for all sets U of cleartext positions: the process of verifying the authentication tag is independent of the set of cleartext positions. The verification of the authentication tag verifies only that the sender sent the ciphertext $C'_0, \ldots, C'_m$, and does not verify which positions are cleartext positions and which positions are not cleartext positions. This may allow an attacker to cause the receiver to use the wrong set of cleartext positions when decrypting the message. To prevent this attack, the sender and receiver must use some other method to verify the cleartext positions that apply to particular ciphertext messages. There are simple solutions to this problem. One solution is to have a standard agreement for which positions are cleartext positions. Another solution is to include, in the data blocks, a representation of the set U of cleartext positions, so that verification of the ciphertext includes verification of the set of cleartext positions.

In the CBC-A mode, the encryption and authentication functions are secure if the underlying block cipher is secure. There are formal expressions in the art for what is meant by the phrase "the encryption and authentication functions are secure," however these formal expressions are not relevant to the subject matter of the instant invention and will not be discussed herein. One skilled in the art will be familiar with the meaning of the phrase "the encryption and authentication functions are secure."

The security proofs are not included, but some observations as to security are presented herein. The proof of security for the encryption function of the CBC-A mode is the same as for the IACBC and XCBC modes. The generation of the authentication tag in the CBC-A mode differs from the generation of the authentication tag in the IACBC and XCBC modes. However, CBC-A verifies the authentication tag using the same steps as the IACBC and XCBC modes. Thus, an attacker can compromise the CBC-A authentication function (that is, produce a CBC-A authentication tag that will be verified as correct), only if the attacker can compromise the IACBC or XCBC authentication functions. Since the designers of IACBC and XCBC modes have already shown that an attacker cannot compromise the IACBC and XCBC authentication functions, it follows that an attacker cannot compromise the CBC-A authentication function. Hence, the CBC-A authentication function is secure.

Note that the sender can choose to send either $P_i$ or $C_i$, and the authentication will not be compromised. The embodiments described herein allow a party to transmit both encrypted and unencrypted blocks without compromising the security of the authentication scheme. If $P_i$ is sent as plaintext, then the encrypted version of $P_i$ is still secret and unpredictable, so that $P_i$ can be used for secure authentication.

It is common practice to define the MAC as only a portion of the final block when using an authentication mode. The present embodiments may also be altered such that only a portion of the final block is transmitted as the MAC.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for encrypting and authenticating data as a single entity, comprising:

arranging data into a plurality of plaintext blocks, each sized according to a cipher block size;

specifying at least one cleartext position for which at least one ciphertext block will be the same as a corresponding plaintext block;

determining a plurality of noise blocks using a nonce value and a first key;

determining a plurality of intermediate ciphertext blocks, wherein the first intermediate ciphertext block corresponds to an encryption of the nonce, and the remaining intermediate ciphertexts are determined by:

for each of the plurality of plaintext blocks specified by a cleartext position, combining the plaintext block with a corresponding noise block; and for each of the plurality of plaintext blocks not specified by a cleartext position, forming an intermediate plaintext block using the plaintext block and a preceding intermediate ciphertext block and then encrypting the intermediate plaintext block using a second key;

determining a plurality of ciphertext blocks, wherein the plurality of ciphertext blocks are determined by:

setting the first ciphertext block equal to the first intermediate ciphertext block;

setting each of the ciphertext blocks specified by a cleartext position equal to a corresponding plaintext block; and determining each of the remaining ciphertext blocks by combining a corresponding intermediate ciphertext block with a corresponding noise block;

determining a plurality of authentication blocks, wherein the plurality of authentication blocks are determined by:

if an authentication block is associated with a plaintext block that is not specified by a cleartext position, then setting the authentication block equal to the plaintext block;

if an authentication block is associated with a plaintext block that is specified by a cleartext position, then determining the authentication block by decrypting an associated intermediate ciphertext block and combining the decrypted associated intermediate ciphertext block with a preceding intermediate ciphertext block;

computing an authentication tag by combining all of the plurality of authentication blocks with a noise block and then encrypting the combined result; and appending the authentication tag to the plurality of ciphertext blocks.

2. The method of claim 1, wherein the encrypting uses block cipher encryption.

3. The method of claim 1, wherein the encrypting and the decrypting comprise:

choosing to apply block cipher encryption or block cipher decryption;

selecting a key and a block cipher to use, according to a set of predetermined selection rules; and using the key with the block cipher on a plurality of input blocks to obtain a plurality of output blocks.

4. The method of claim 1, wherein combining is performed using a bitwise exclusive-or operation.

5. The method of claim 1, wherein combining is performed using a group operator.

6. The method of claim 5, wherein the group operator is a modular integer addition operator.

7. The method of claim 6, wherein the nonce value is pre-negotiated between a receiver of the plurality of transmission blocks and the sender of the plurality of transmission blocks.

8. The method of claim 6, wherein the nonce value is derived from the first transmission block.

9. A method for decrypting and verifying a plurality of transmission blocks accompanied by an authentication tag, comprising:

determining a plurality of noise blocks using a nonce value and a first key;

determining a plurality of intermediate ciphertext blocks by combining each of the plurality of transmission blocks with a corresponding noise block;

determining a plurality of authentication blocks, wherein each of the plurality of authentication blocks is formed by decrypting a corresponding intermediate ciphertext block and then combining the decrypted intermediate ciphertext block with a preceding intermediate ciphertext block;

setting each of the plurality of authentication blocks that is not associated with any predetermined cleartext position as a plaintext block;

setting each of the plurality of transmission blocks that is associated with any predetermined cleartext position as a plaintext block; and verifying the authentication tag by determining whether the last authentication block equals the combination of all other authentication blocks.

10. Apparatus for encrypting and authenticating data as a single entity, comprising:

at least one memory element; and at least one processing element configured to execute a set of instructions stored on the at least one memory element, the set of instructions for:

arranging data into a plurality of plaintext blocks, each sized according to a cipher block size;

specifying at least one cleartext position for which at least one ciphertext block will be the same as a corresponding plaintext block;

determining a plurality of noise blocks using a nonce value and a first key;

determining a plurality of intermediate ciphertext blocks, wherein the first intermediate ciphertext block corresponds to an encryption of the nonce, and the remaining intermediate ciphertexts are determined by:

for each of the plurality of plaintext blocks specified by a cleartext position, combining the plaintext block with a corresponding noise block; and for each of the plurality of plaintext blocks not specified by a cleartext position, forming an intermediate plaintext block using the plaintext block and a preceding intermediate ciphertext block and then encrypting the intermediate plaintext block using a second key;

determining a plurality of ciphertext blocks, wherein the plurality of ciphertext blocks are determined by:

setting the first ciphertext block equal to the first intermediate ciphertext block;

setting each of the ciphertext blocks specified by a cleartext position equal to a corresponding plaintext block; and determining each of the remaining ciphertext blocks by combining a corresponding intermediate ciphertext block with a corresponding noise block;

determining a plurality of authentication blocks, wherein the plurality of authentication blocks are determined by:

if an authentication block is associated with a plaintext block that is not specified by a cleartext position, then setting the authentication block equal to the plaintext block;

if an authentication block is associated with a plaintext block that is specified by a cleartext position, then determining the authentication block by decrypting an associated intermediate ciphertext block and combining the decrypted associated intermediate ciphertext block with a preceding intermediate ciphertext block;

computing an authentication tag by combining all of the plurality of authentication blocks with a noise block and then encrypting the combined result; and appending the authentication tag to the plurality of ciphertext blocks.

11. Apparatus for decrypting and verifying a plurality of transmission blocks accompanied by an authentication tag, comprising:

at least one memory element; and at least one processing element configured to execute a set of instructions stored on the at least one memory element, the set of instructions for:

determining a plurality of noise blocks using a nonce value and a first key;

determining a plurality of intermediate ciphertext blocks by combining each of the plurality of transmission blocks with a corresponding noise block;

determining a plurality of authentication blocks, wherein each of the plurality of authentication blocks is formed by decrypting a corresponding intermediate ciphertext block and then combining the decrypted intermediate ciphertext block with a preceding intermediate ciphertext block;

setting each of the plurality of authentication blocks that is not associated with any predetermined cleartext position as a plaintext block;

setting each of the plurality of transmission blocks that is associated with any predetermined cleartext position as a plaintext block; and verifying the authentication tag by determining whether the last authentication block equals the combination of all other authentication blocks.

12. Apparatus for encrypting and authenticating data as a single entity, comprising:

means for arranging data into a plurality of plaintext blocks, each sized according to a cipher block size;

means for specifying at least one cleartext position for which at least one ciphertext block will be the same as a corresponding plaintext block;

means for determining a plurality of noise blocks using a nonce value and a first key;

means for determining a plurality of intermediate ciphertext blocks, wherein the first intermediate ciphertext block corresponds to an encryption of the nonce, and the remaining intermediate ciphertexts are determined by:

for each of the plurality of plaintext blocks specified by a cleartext position, combining the plaintext block with a corresponding noise block; and for each of the plurality of plaintext blocks not specified by a cleartext position, forming an intermediate plaintext block using the plaintext block and a preceding intermediate ciphertext block and then encrypting the intermediate plaintext block using a second key;

means for determining a plurality of ciphertext blocks, wherein the plurality of ciphertext blocks are determined by:

setting the first ciphertext block equal to the first intermediate ciphertext block;

setting each of the ciphertext blocks specified by a cleartext position equal to a corresponding plaintext block; and determining each of the remaining ciphertext blocks by combining a corresponding intermediate ciphertext block with a corresponding noise block;

means for determining a plurality of authentication blocks, wherein the plurality of authentication blocks are determined by:

if an authentication block is associated with a plaintext block that is not specified by a cleartext position, then setting the authentication block equal to the plaintext block;

if an authentication block is associated with a plaintext block that is specified by a cleartext position, then determining the authentication block by decrypting an associated intermediate ciphertext block and combining the decrypted associated intermediate ciphertext block with a preceding intermediate ciphertext block;

means for computing an authentication tag by combining all of the plurality of authentication blocks with a noise block and then encrypting the combined result; and means for appending the authentication tag to the plurality of ciphertext blocks.

13. Apparatus for decrypting and verifying a plurality of transmission blocks accompanied by an authentication tag, comprising:

means for determining a plurality of noise blocks using a nonce value and a first key;

means for determining a plurality of intermediate ciphertext blocks by combining each of the plurality of transmission blocks with a corresponding noise block;

means for determining a plurality of authentication blocks, wherein each of the plurality of authentication blocks is formed by decrypting a corresponding intermediate ciphertext block and then combining the decrypted intermediate ciphertext block with a preceding intermediate ciphertext block;

means for setting each of the plurality of authentication blocks that is not associated with any predetermined cleartext position as a plaintext block;

means for setting each of the plurality of transmission blocks that is associated with any predetermined cleartext position as a plaintext block; and means for verifying the authentication tag by determining whether the last authentication block equals the combination of all other authentication blocks.

14. A method for secure data transmissions, wherein a first portion of the data transmission is sent as plaintext, a second portion of the data transmission is sent as ciphertext, and all of the data transmission is authenticated, the method comprising:

generating a set of cleartext positions;

encrypting the first portion of the data transmission and the second portion of the data transmission into ciphertext, wherein the first portion of the data transmission is specified by the set of cleartext positions and second portion of the data transmission is not associated with any one of the set of cleartext positions;

determining a plurality of intermediate ciphertext blocks through an iterative procedure;

generating a plurality of authentication blocks, wherein each of a first portion of the plurality of authentication blocks is set equal to a corresponding member of the first portion of the data transmission and each of a second portion of the plurality of authentication blocks is derived from combining a corresponding intermediate ciphertext block and a previous intermediate ciphertext block;

generating an authentication tag by combining each of the plurality of authentication blocks and a noise block and encrypting the combined result;

transmitting the plaintext, the ciphertext, and the authentication tag, wherein the plaintext is the first portion of the data transmission specified by the set of cleartext positions.

15. Apparatus for secure data transmissions, wherein a first portion of the data transmission is sent as plaintext, a second portion of the data transmission is sent as ciphertext, and all of the data transmission is authenticated, the method comprising:

means for generating a set of cleartext positions;

means for encrypting the first portion of the data transmission and the second portion of the data transmission into ciphertext, wherein the first portion of the data transmission is specified by the set of cleartext positions and second portion of the data transmission is not associated with any one of the set of cleartext positions;

means for determining a plurality of intermediate ciphertext blocks through an iterative procedure;

means for generating a plurality of authentication blocks, wherein each of a first portion of the plurality of authentication blocks is set equal to a corresponding member of the first portion of the data transmission and each of a second portion of the plurality of authentication blocks is derived from combining a corresponding intermediate ciphertext block and a previous intermediate ciphertext block;

means for generating an authentication tag by combining each of the plurality of authentication blocks and a noise block and encrypting the combined result;

means for transmitting the plaintext, the ciphertext, and the authentication tag, wherein the plaintext is the first portion of the data transmission specified by the set of cleartext positions.

* * * * *